Joseph Thomas Benz
INVENTOR.

BY Murray Robinson
ATTORNEY

March 27, 1962  J. T. BENZ  3,026,693
KELLY BUSHING

Filed Sept. 2, 1958  2 Sheets-Sheet 2

Joseph Thomas Benz
INVENTOR.

BY
Murray Robinson
ATTORNEY

United States Patent Office 3,026,693
Patented Mar. 27, 1962

3,026,693
KELLY BUSHING
Joseph Thomas Benz, Oklahoma City, Okla., assignor to American Iron & Machine Works Company, Inc., Oklahoma City, Okla., a corporation of Delaware
Filed Sept. 2, 1958, Ser. No. 758,385
5 Claims. (Cl. 64—23.7)

This invention pertains to kelly drives used in the rotary method of drilling. More particularly the invention pertains to roller kelly drive bushings adapted to fit in the master bushing of a rotary table such as used in drilling for oil by the rotary method.

Briefly the invention includes a body having a circular base beneath which extends a square pin adapted to be received in the square socket of a rotary table master bushing and above which extend four pairs of posts providing four sets of shaft support holes. The posts of each pair are asymmetrically placed relative to the base diameters. Between each pair of posts is pivotally mounted an H shaped cage with a shaft extending through the cross bar of the H shaped cage into the pair of support holes provided by the posts, the cage cross bar having a bushing where it pivots about the shaft. Each cage carries a pair of rollers rotatably mounted on shafts carried by the opposite ends of the cage, the rollers being provided with bushings to rotate on the shafts. Releasable means is provided to fix each cage and roller shaft against rotation and prevent axial motion thereof. Each cage and roller shaft has an axial grease passage therethrough joining radial passages communicating with the exterior of the shaft within the corresponding bushing. Each bushing is recessed adjacent the ends of the radial passages in the shaft to communicate the grease with the whole periphery of the shaft. Spring pressed ball check valves in the ends of the axial passages through the shafts provide means for introducing grease. Different sizes and shapes of rollers can be used. A lower cylindrical housing is secured to the body on top of the base; an upper housing is releasably connected to the tops of the posts. Ports in the housings permit access to the grease valves for lubricating the shafts and bushings.

Advantages of the construction include the direct lubrication of each roller as well as each cage, with provision for the escape of used grease between rollers and cage, whereby used grease can be completely flushed out and replaced and the grease escaping between rollers and cage provides seals against entrance of dirt and other foreign matter into the bearing area.

The centrally pivoted cage mounted rollers cause the kelly to be driven smoothly without wobbling, whip, vibration, or binding during axial feed, despite misalignment of the rotary table and crown block and despite crookedness of the kelly, while assuring positive drive and adequate dispersal of driving pressure on the kelly. This arises by virtue of the kinematic geometry of the pivot cage mounted rollers whereby the normal tolerances needed to fit any bushing around a kelly allow the caged rollers to align themselves with the kelly despite such misalignment and crookedness. The resulting absence of bending moments in the kelly reduces wear and vibration and prevents binding. The kinematics of the caged rollers makes it impossible for but one of the rollers of each cage to take all of the driving torque, thereby insuring adequate dispersal of driving pressure and avoiding Brinnelling of the kelly.

The ported cylindrical housing protects the apparatus and reduces the hazard to personnel adjacent the apparatus while assuring that the apparatus can be easily serviced without need to remove the housing.

The ready removal and replacement of the roller cage shafts makes it a simple matter to remove two adjacent cages so that the apparatus can be threaded over the enlarged end of a kelly and the cages replaced prior to use.

The construction is strong and rugged and able to withstand the customary oil field abuse as well as last a long time under intended conditions of use.

The adaptability of the apparatus to use with standard A.P.I. master bushings and the easy removal and replacement of the roller shafts whereby change of rollers to fit different sizes and shapes of kellys is facilitated makes the apparatus of wide applicability.

The asymmetric placement of the cage shaft support posts makes possible the use of rollers of different sizes without interference while still maintaining contact between rollers and kelly at maximum torque radius.

For a more detailed description of a preferred embodiment of the invention, reference will now be made to the accompanying drawings wherein.

Figure 1:
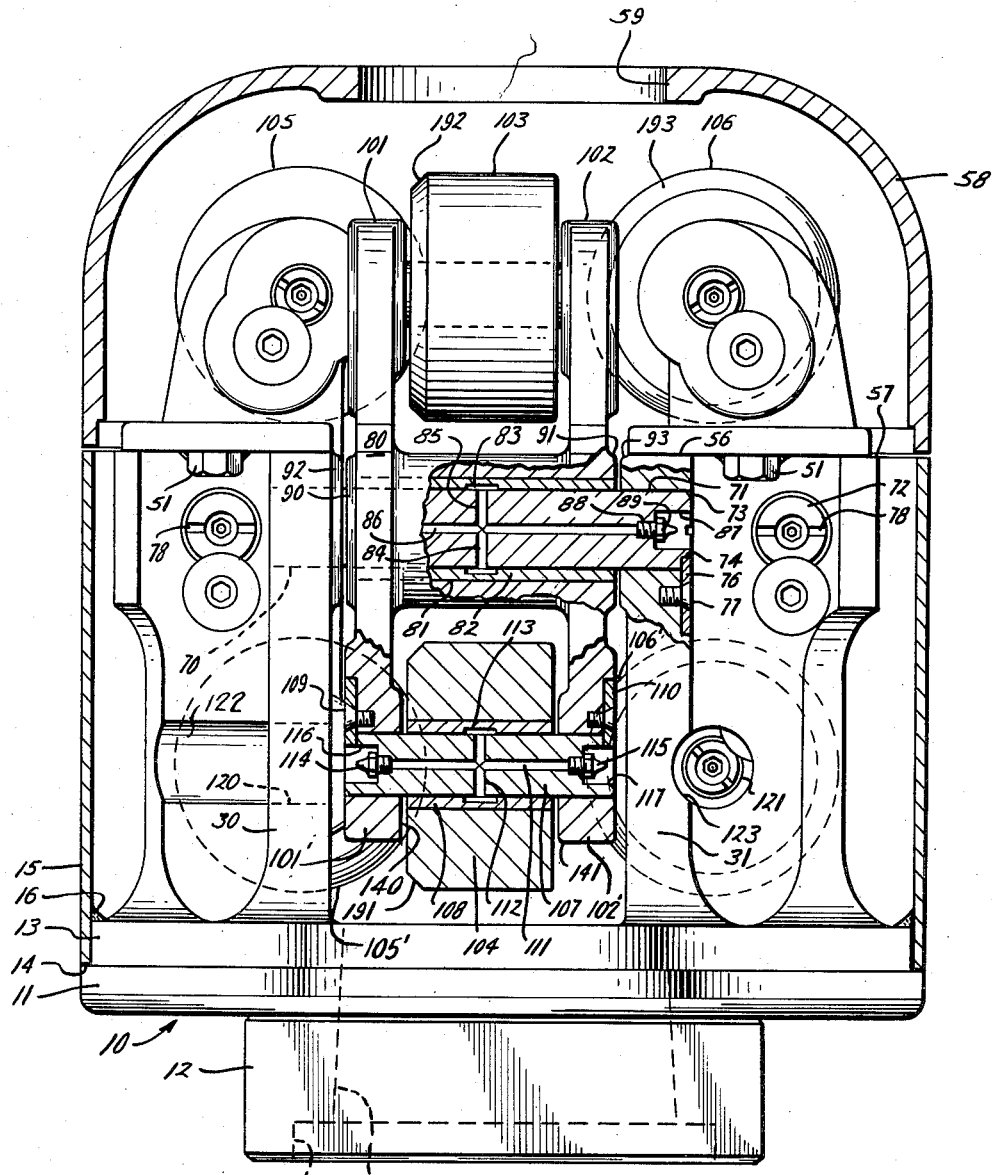
FIGURE 1 is a front elevation of a kelly bushing embodying the invention having rollers therein adapted to engage a square kelly of medium size, the housings being cut away in vertical section to show the interior of the apparatus, and portions of the front cage and lower roller being sectioned to show the lubrication systems therefor.
Figure 2:
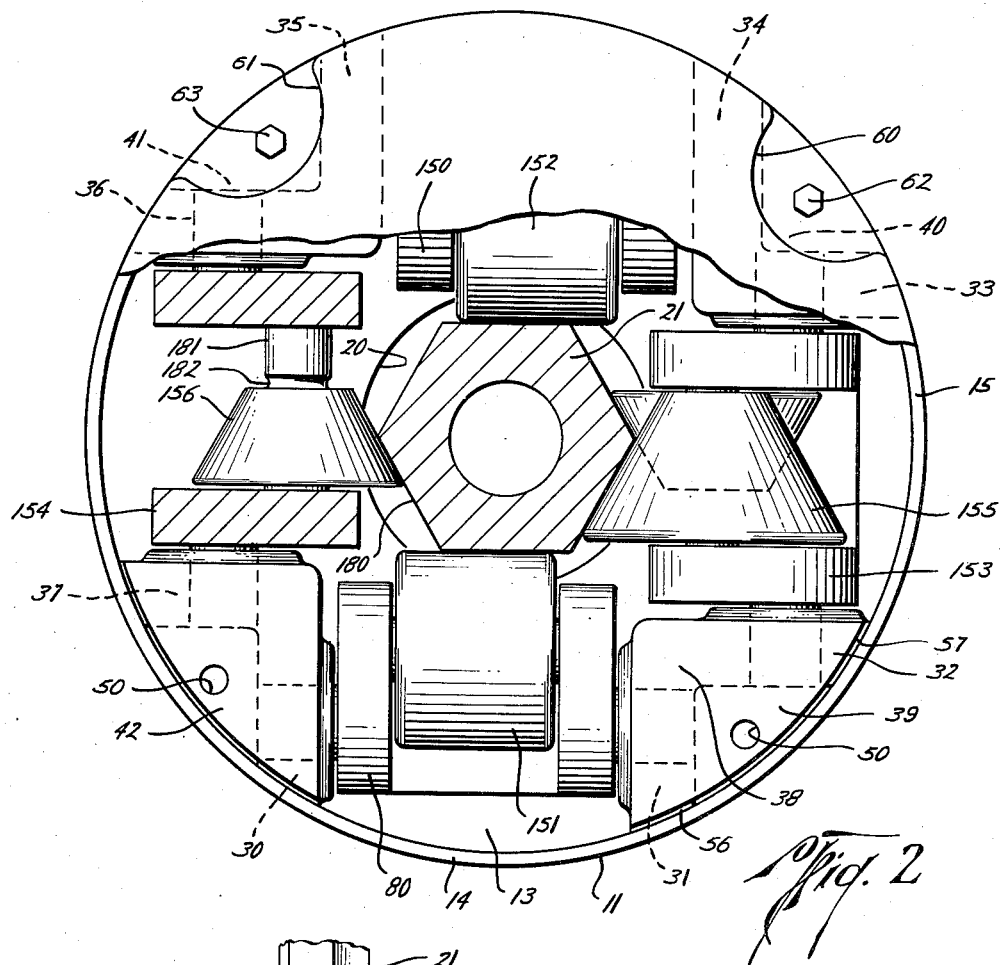
FIGURE 2 is a plan view of the FIGURE 1 apparatus with both of the housings broken away and one cage broken away partially to show the lower roller, different rollers having been substituted suitable for use with a large size hexagonal kelly.

Referring now to FIGURES 1 and 2, the two apparatuses being identical except for the rollers, there is shown a body 10 having a circular base portion 11. Beneath the base extends a square pin 12 adapted to fit in the master bushing of a conventional rotary table. The upper portion 13 of the base 11 is of reduced diameter providing a shoulder 14 on which rests a cylindrical lower husing 15. The lower housing is welded to the base at 16.

Figure 3:
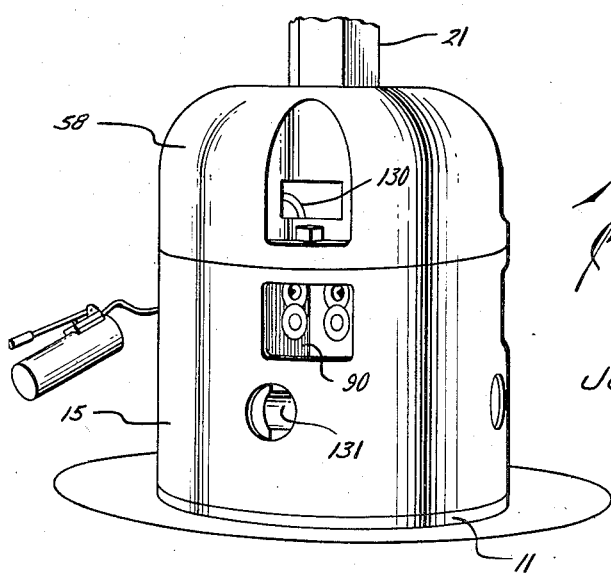
FIGURE 3 is a perspective of the apparatus of FIGURE 2 showing the exterior thereof, the apparatus being shown disposed in a rotary table and around a hexagonal kelly, and illustrating the manner of servicing the bearings.

There is a circular cross section passage 20 through the body adapted to receive a kelly such as hexagonal kelly 21, shown only in FIGURE 2 (and FIGURE 3). There is a counterbore 22 in the lower end of pin 12 adapted to rest on the pin of a support in the rat hole (not shown) when the kelly and kelly bushing are not in use: Preferably passage 20 is slightly flaring downwardly, as shown in FIGURE 1, to facilitate placement thereof over the upper end of a kelly.

The body 10 further includes four pairs of posts 30—31, 32—33, 34—35, 36—37. For added strength each post is joined at its inner edge to the adjacent post of the adjacent pair as shown at 38 forming an angle. On top of the angles are arcuate plates 39, 40, 41, 42. Preferably, the body including pin, base, posts and plates is an integral steel casting.

Each plate is provided with a hole 50 beneath which is disposed a threaded nut 51 welded to the plate concentric with the hole. The peripheries of plates 39–42 are of less radial extent than the outer edges of the posts leaving shoulders such as 56, 57 to facilitate placement of an per housing 58. Housing 58 is dome shaped and has an opening 59 through the top thereof through which a kelly may pass. There are four indented portions such as 60, 61 around the upper housing, the lower portions of which are flat and adapted to rest on top of the plates. There is a hole through each indented portion of the upper housing adapted to receive a screw such as 62, 63 which engages the nuts beneath the plates to hold the housing in position.

Each pair of posts such as 30, 31, provides a pair of aligned support holes such as 70, 71 adapted to receive a shaft such as 72. Each shaft 72 is slightly bevelled at its ends as shown at 73 to facilitate placement in the support holes. An arcuate recess 74 is formed on each end of the shafts 72 to receive the overlapping edge of a retaining washer 76 which holds the shaft against both axial and rotary motion relative to the post. Washer 76 is held in place by socket headed screw 77. To facilitate placement of shaft 72 in support holes 70, 71 and alignment of arcuate recess 74 with washer 76, the ends of the shaft are slotted as shown at 78.

Each shaft 72 has a cage 80 pivotally mounted thereon. Each cage is of H shape with a hole 81 through the cross bar receiving the corresponding shaft 72. The holes 81 are provided with bronze bushing sleeves 82. Within each sleeve 82 is an annular grease reservoir groove 83. Communicating with groove 83 are radial passages 84, 85 in the shaft 72 which connect to axial passage 86 extending from one end of shaft 72 to the other. The ends of passage 86 are counterbored and threaded as shown at 87, 88 to receive check valve fittings 89 adapted to be connected to a conventional grease gun. Referring momentarily to FIGURE 3, four openings 90 spaced around the lower housing 15 provide access to the grease check valve fittings without the necessity of removing the housings.

Returning to FIGURES 1 and 2, when grease is pumped through a check valve 89 it goes through an axial passage 86 and out through radial passages 84, 85 into annular reservoir 83 and thence out between the bushing sleeve 82 and shaft 72, flushing out the old grease ahead of it. The grease escaping at the ends of shaft 72 goes into the space between bosses 90, 91 on the cage and bosses 92, 93 on the posts forming a seal against entrance of dirt, water and other foreign matter to the bearing area between sleeve 82 and shaft 72.

Between the pairs of legs 101—102, 101'—102' at the upper and lower ends of each H-shaped cage 80 are rotatably mounted rollers such as rollers 103, 104, 105', 106' shown in FIGURE 1. The rollers are mounted on shafts such as 107 on which rollers 104 is mounted. Each roller has a bushing sleeve such as 108 in roller 104. Shaft 107 is prevented from turning and moving axially by washers such as 109, 110, similar to the mounting of shaft 72. Shafts 107 and bushing sleeves 108 are provided with axial, radial, and annular grease passages 111, 112, 113 similar to those of shaft 72 and sleeve 82, to which grease is pumped through check valves 114, 115, screwed into counterbores 116, 117 in the ends of the shaft 107. When it is desired to lubricate the rollers, a conventional grease gun is used the same as for the cage.

One of each pair of posts is provided with a port such as 120, 121 and the adjacent post of the adjacent pair is provided with a channel such as 122, 123 whereby a grease gun can be connected to one of the grease check valve fittings of each lower roller while it is mounted in its cage and the cage is mounted between its support posts. The upper rollers are on shafts above the level of the tops of the posts and plates so they can be lubricated from both ends. As shown in FIGURE 3, four sets of upper ports 130 and four sets of lower ports 131 make it possible to lubricate the rollers without removing the housings. Lower ports 131 are aligned with channels 122, 123 and the holes 120, 121 in the posts.

When the grease in the roller lubrication passages is flushed out, the excess grease exuding between the ends of bushing sleeves 108 and shafts 107 escapes into the space between bosses 140, 141 on the inside of the cage and the adjacent sides of the rollers to form seals against dirt, water and other foreign matter.

Referring particularly to FIGURE 2, there are shown the rollers used to drive a hexagonal kelly. In the cages 80, 150 on the front and back sides of the apparatus there are cylindrical rollers such as 151, 152 in the tops of the cages and like rollers in the bottoms of the cages. In the cages 153, 154 at the sides of the apparatus are disposed pairs of rollers such as upper roller 155 and lower roller 156. Top roller 155 in cage 153 is conical and adapted to engage a side of the kelly adjacent the side engaged by roller 151. The roller in the bottom of cage 153 is similar to roller 156 and is adapted to engage the side of the kelly adjacent to the side engaged by roller 152. Similarly the upper and lower rollers of cage 154 are adapted to engage different sides of the kelly.

It will be noted that the pairs of posts supporting each roller are asymmetrically located with respect to the diameters through the center of the kelly perpendicular to the roller axes, being displaced clockwise, so that when larger diameter rollers are used to drive smaller size kellys, the rollers do not interfere, while at the same time each roller bears at or near the leading corner of the adjacent side of the kelly where it has the maximum torque radius. The posts provide means holding each cage against all rotation about a vertical axis relative to the body 10.

It is because of the asymmetric positioning of the pairs of posts that the two rollers for the side cages are of different shape to engage the two different sides of the kelly. The roller 156, engaging the side 180 of the kelly, has its largest cone diameter at the end of the roller nearest the perpendicular diameter (the diameter through the kelly center and perpendicular to the roller axis). Therefore the largest cone diameter of roller 156 is smaller than that of roller 155 whose largest cone diameter is at the end of the roller farthest from the perpendicular diameter. Because the largest diameter of roller 156 is smaller, it is necessary to discontinue the cone taper after it leaves the kelly and finish off with a cylindrical portion 181. The juncture between the conical and cylindrical portions is provided with a stress relief groove 182.

The reason roller 155 of larger cone diameter is preferably placed at the top of the side cages is because there is more room at the top under the upper housing than there is at the bottom above the base.

When larger diameter rollers are substituted to engage a smaller kelly, the cylindrical rollers are bevelled on their ends that are farthest from the perpendicular diameter. This is shown at 191, 192, 193 in FIGURE 1. This provides additional clearance without reducing the area of contact with the kelly which in such case has smaller sides available for contact by the rollers.

In operation of the kelly bushing above described, it is to be noted that if a cage tilts so that one of its rollers is out of contact with the kelly or has less contact pressure than the other, there is created a torque automatically turning the cage about its axis to equalize the pressures of the upper and lower rollers. The same torque also automatically places each cage parallel to the kelly axis instead of placing a bending moment on the kelly to align it with the cage. These are marked advantages over roller kelly bushings having the rollers mounted on fixed axes.

In connection with the alignment of the cages with the kelly, it is to be noted that when the cages turn out of their vertical positions in order to follow a crooked or non-vertical kelly, the distance between the cages is reduced slightly. However with the usual tolerances required to manufacture and assemble the apparatus and to place it over a kelly, the distance between the cages and their rollers is not reduced to a point sufficient to bind on the kelly until the cage has moved far more than the maximum amount needed to accommodate any deviation of the kelly from vertical that is to be expected in practice. The elasticity of the materials increases the amount of angular displacement of the cages possible without binding on the kelly.

The housings around the cages and rollers permit them to operate while the apparatus is rotating with a rotary table without danger to personnel adjacent thereto. The bearings of the cage and rollers are easily serviced without removing the protecting housings, thereby reducing the likelihood of the housings being left off or the servicing being omitted.

While a preferred embodiment of the invention has been shown and described many modifications thereof can be made by one skilled in the art without departing from the spirit of the invention and it is desired to protect by Letters Patent all forms of the invention falling within the scope of the following claims.

I claim:

1. A roller kelly bushing comprising a body having a vertical hole therethrough to receive a kelly, a plurality of pairs of cages, the cages of each pair being disposed on diametrically opposite sides of said hole, means independently pivotally mounting each cage directly on the body for rotation about a horizontal axis perpendicular to a radius from said hole extending through the cage and simultaneously holding the cage against all rotation about a vertical axis relative to said body, each cage having a roller rotatably mounted thereon above the cage pivot axis and another roller rotatably mounted thereon below the cage pivot axis, the position of each of said pairs of cages being unaffected by the rotation of the other of said pairs of cages.

2. The combination of claim 1 in which each cage is of H shape with the bar of the H forming the pivot axis of the cage and the rollers are pivotally mounted between the ends of the upper and the lower pairs of legs of the cage.

3. A roller kelly bushing comprising a body including a base having a vertical hole therethrough to receive a kelly and four pairs of vertical posts on the upper side of the base, four shafts disposed with one between each pair of posts with its axis horizontal, said pairs of posts being placed so as to locate said four shafts with the axis of each lying along a different one of the four sides of a rectangle extending around said hole, four cages each independently pivotally mounted on one of said shafts for rotation about the axis thereof, the location of said shafts disposing said cages in two pairs with the cages in each pair on opposite sides of said hole, each cage having a roller rotatably mounted thereon above the cage pivot axis and another roller rotatably mounted thereon below the cage pivot axis, the rollers of one cage of one pair of cages being adapted to engage one side of a kelly and the rollers of the other cage of said one pair being adapted to engage the opposite side of the kelly and said cages of said one pair rotating equal amounts about their shafts in case of misalignment of the kelly, the position of the other of said pairs of cages being unaffected by the rotation about its shafts of said one of said pairs of cages, said posts holding said cages against all rotation about a vertical axis relative to said body and against all rotation about a horizontal axis other than the axis of said shaft.

4. A roller kelly bushing comprising a body including a base having a vertical hole therethrough to receive a kelly and a plurality of pairs of vertical posts on the upper side of the base, a shaft disposed between each pair of posts with its axis horizontal and perpendicular to a radius from the hole, a plurality of cages each pivotally mounted on one of said shafts for rotation about the axis thereof, each cage being of H shape with the bar of the H forming the pivot axis of the cage, each cage having a roller rotatably mounted thereon between the upper legs of the H and another roller rotatably mounted thereon between the lower legs of the H.

5. A roller kelly bushing comprising a base having a hole vertically therethrough to receive a kelly and a plurality of cages each pivotally mounted thereon for rotation about a horizontal axis, each cage having a roller rotatably mounted thereon above the cage pivot axis and another roller rotatably mounted thereon below the cage pivot axis, characterized by the fact that there are four pairs of posts, four cages, one cage being mounted between each of the four pairs of posts, the pairs of posts are equally spaced around the top of the base, the rollers on two opposite cages all have cylindrical portions for contacting a kelly, and the other two cages have conical rollers for contacting a kelly, the upper and lower conical rollers in each of the last two said cages tapering in opposite directions.

References Cited in the file of this patent

UNITED STATES PATENTS

| 1,020,210 | Lobnitz | Mar. 12, 1912 |
| 1,656,456 | Trout | Jan. 17, 1928 |
| 2,169,264 | Long | Aug. 15, 1939 |
| 2,202,446 | Esseling | May 28, 1940 |
| 2,312,323 | Derrick | Mar. 2, 1943 |

FOREIGN PATENTS

| 620,446 | Germany | Oct. 21, 1935 |
| 661,080 | France | Feb. 26, 1929 |
| 957,424 | Germany | Jan. 31, 1957 |